US006748657B1

(12) United States Patent
Okazaki et al.

(10) Patent No.: US 6,748,657 B1
(45) Date of Patent: Jun. 15, 2004

(54) METHOD OF MANUFACTURING AN INK JET RECORDING HEAD

(75) Inventors: Takeshi Okazaki, Sagamihara (JP); Shunichi Watanabe, Tokyo (JP); Tsutomu Abe, Isehara (JP); Koichi Omata, Kawasaki (JP); Hirotaka Miyazaki, Yokohama (JP); Ryo Shimamura, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/625,841

(22) Filed: Jul. 26, 2000

(30) Foreign Application Priority Data

Jul. 27, 1999 (JP) .......................................... 11-211767
Jun. 15, 2000 (JP) ...................................... 2000-180345

(51) Int. Cl.[7] .......................... B21D 53/76; B23K 26/02
(52) U.S. Cl. .......................... 29/890.1; 347/44; 347/47; 219/121.7; 219/121.74
(58) Field of Search ............................ 29/890.1, 25.35, 29/611; 347/44, 47; 219/121.7, 121.71, 121.74

(56) References Cited

U.S. PATENT DOCUMENTS

| | | | |
|---|---|---|---|
| 4,313,124 A | 1/1982 | Hara | |
| 4,345,262 A | 8/1982 | Shirato et al. | |
| 4,459,600 A | 7/1984 | Sato et al. | |
| 4,463,359 A | 7/1984 | Ayata et al. | |
| 4,558,333 A | 12/1985 | Sugitani et al. | |
| 4,723,129 A | 2/1988 | Endo et al. | |
| 4,740,796 A | 4/1988 | Endo et al. | |
| 5,208,604 A | 5/1993 | Watanabe et al. | |
| 6,048,049 A | 4/2000 | Ishimatsu et al. | |
| 6,320,158 B1 * | 11/2001 | Kitajima et al. | 219/121.7 |

FOREIGN PATENT DOCUMENTS

| | | | |
|---|---|---|---|
| EP | 0 495 649 | 7/1992 | |
| JP | 54-56847 | 5/1979 | |
| JP | 05-123670 | 7/1984 | |
| JP | 59-138461 | 8/1984 | |
| JP | 60-71260 | 4/1985 | |
| JP | 1-294047 | * 11/1989 | 29/890.1 |
| JP | 2-121842 | * 5/1990 | 29/890.1 |
| JP | 6-210858 | 8/1994 | |
| JP | 10-013980 | 1/1998 | |
| JP | 11-165893 | 6/1999 | |
| JP | 11-277746 | 10/1999 | |

OTHER PUBLICATIONS

Endert, "Excimer Lasers as Tools for Material Processing in Manufacturing", Advanced Appications of Lasers in Materials Processing, Aug. 1996, pp. 28–29.*

* cited by examiner

*Primary Examiner*—A. Dexter Tugbang
(74) *Attorney, Agent, or Firm*—Fitzpatrick, Cella, Harper & Scinto

(57) ABSTRACT

A method for manufacturing an ink jet recording head, which is provided with a first base plate having energy generating elements, a second base plate having grooves for forming ink flow paths corresponding to the energy generating elements, and a discharge port forming member for forming discharge ports for discharging ink. The method includes the steps of forming the discharge ports by irradiating the discharge port forming member with laser light reflected from the groove wall faces, and direct laser light, and forming the flow paths by bonding the base plate and the second base plate with the grooves inside.

15 Claims, 12 Drawing Sheets

FORWARD

FORWARD ⇒

BACKWARD

BACKWARD ⇐

METHOD OF MANUFACTURING AN INK JET RECORDING HEAD

BACKGROUND OF THE INVENTION

1. Field of the Invention

The present invention relates to an ink jet recording head for forming images and the like on a recording medium, and a method of manufacture therefor. More particularly, the invention relates to a method for forming the discharge ports of an ink jet recording head.

2. Related Background Art

Conventionally, as one of the methods for forming discharge ports of an ink jet recording head, there has been known the one in which openings are made by means of laser processing on the grooved ceiling plate from behind the flow paths, which is the so-called grooved ceiling plate integrally formed with an orifice plate, having the grooves to from ink flow paths, as well as the discharge port forming member (the orifice plate) for forming the discharge ports in front of those grooves, respectively.

When the drilling of the kind is performed from behind the flow paths, laser beams are kicked by the grooves of the grooved ceiling plate, which makes it impossible to effectuate incidence from right behind (at the drilling angle of 0°). The drilling is, therefore, performed at an angle of approximately 10°, and the resultant angle of each hole formed on the orifice plate is approximately 10° to the flow paths.

FIG. 9 is a view which schematically shows the example of the conventional laser processing. In FIG. 9, a reference numeral 1 designates a nozzle drilled by the laser processing; 1*a*, a discharge port on the outer end of the nozzle 1; 2, a flow path to supply ink; 3, an orifice plate where drilling is made; 4, a grooved ceiling plate; 5, laser processing surface; 6, laser beam; and 7, a heater (heat generating element). As shown in FIG. 1, the laser incident angle is usually 10°±1° approximately.

However, with a certain angle of a hole to the flow path as described above in a series of operations, such as supplying ink from the common liquid chamber to a flow path, and then, enabling ink to fly out of the discharge port through the hole (flow path) formed by the laser processing, the direction of the flow rate vector of liquid is caused to change on the way to create subtle disturbance of liquid flow. As a result, the flow rate vector collides with the flow path walls to make the orientation unstable when ink is discharged to fly from each discharge port. Not only the discharge energy is dispersed, but also, the flying directions of the main droplet and its satellites are caused to differ eventually.

Under the circumstances, the main droplet and its satellites are impacted on different positions on a recording medium when an image is formed on the recording medium, hence disturbing the recorded image. Also, when the reciprocal printing is performed by use of a serial printer or the like, the flying direction of liquid droplets is not perpendicular to a recording medium from the outset, because the flow path axis is not orthogonal to the orifice plate surface. Further, the distance between impacted dots is caused to change at the time of "forward" and "backward" operations, which may also bring about the uneven density.

In addition, the distance between the head and the recording medium (the flying distance of ink) is caused to change delicately by cockling of the recording medium to be carried. As a result, the impacted positions of the main and satellite droplets may also change to cause uneven density.

SUMMARY OF THE INVENTION

It is an object of the present invention to provide an ink jet recording head capable of enhancing the overall image quality by eliminating the deviation in flying directions of the main droplet and satellites due to the inclined axis of discharge, and the instability of discharge directions and discharging power, as well as by improving image unevenness on the forward and backward printing among some others. The invention is also aimed at providing a method for manufacturing such ink jet recording head.

In this respect, the applicant hereof has filed an application (Japanese Patent Laid-Open Application 10-13980) for various patents that include means for controlling drilling angles and the like by adjusting the amount of light transmission by use of gradient mask in order to shield laser beams locally or stepwise. The aforesaid means is the one whereby to control the drilling angles effectively just by forming adjustment patterns for the amount of light transmitted to a drilling mask. With this means, the drilling angle is made considerably close to the horizontal as compared with the conventional art, thus enhancing the stability of discharge direction. It is another object of the present invention to improve the invention disclosed in the specification of the previous application.

More specifically, with respect to the means that uses gradient mask, the patterns of gradient portion are changed one to one in accordance with the parameters of the thickness or the hole area of an orifice plate if changed any, and if the nozzle design may change, it should also change accordingly. Here, there is automatically a limit to the pattern that may be incorporated with one mask. Therefore, should a number of patterns exceed such limit, the masks are exchanged. Also, if laser processing should be required to be performed for a plurality of blocks which are divided for the formation of the grooved ceiling plate to be used for an elongated line head, the mask pattern exchange performance is included in the drilling sequence in order to obtain the same hole configurations between the processing blocks, because the thickness of an orifice plate may delicately change depending on a drilling block.

In other words, it is still another object of the present invention to provide an excellent ink jet recording head capable of performing vertical discharges as described above, which can be manufactured more simply and efficiently, as well as to provide the method of manufacture therefor. With this method, it becomes possible to obtain uniform shape and area of each hole particularly for an elongated head or the like, and also, to reduce the designing load with simpler process procedures. The invention is also aimed at providing the method for manufacturing such ink jet recording head.

It is a further object of the invention to provide a method for manufacturing an ink jet recording head, which is provided with a first base plate having energy generating elements for generating energy utilized for discharging ink, and a second base plate bonded to the first base plate which has grooves for forming ink flow paths corresponding to said energy generating elements, and discharge port forming member for forming discharge ports for discharging said ink integrally formed in front of the grooves, comprises the steps of forming the discharge ports by drilling the discharge port forming member with the reflecting light of laser beams reflected from the groove wall faces of the second substrate, and the direct light of laser beams on the discharge port forming member; and forming the flow paths by bonding the first base plate and the second base plate with the grooves inside.

In accordance with the invention thus structured, the nozzles capable of performing vertical discharges can be materialized by the system which is simpler than the conventional one. Then, it is made possible to overcome the long standing difficulty for the grooved ceiling plate (the ceiling plate integrally formed with the orifice plate) that deviation may occur in the flying directions of the main droplet and its satellites due to the inclined discharge axis, and that the discharge direction and discharging power may become instable. Hence, the overall image quality can be enhanced by improving the image unevenness that may be brought about by the forward and backward printing.

DETAILED DESCRIPTION OF THE PREFERRED EMBODIMENTS

Hereinafter, the detailed description will be made of the preferred embodiments in accordance with the present invention.

Figure 1:
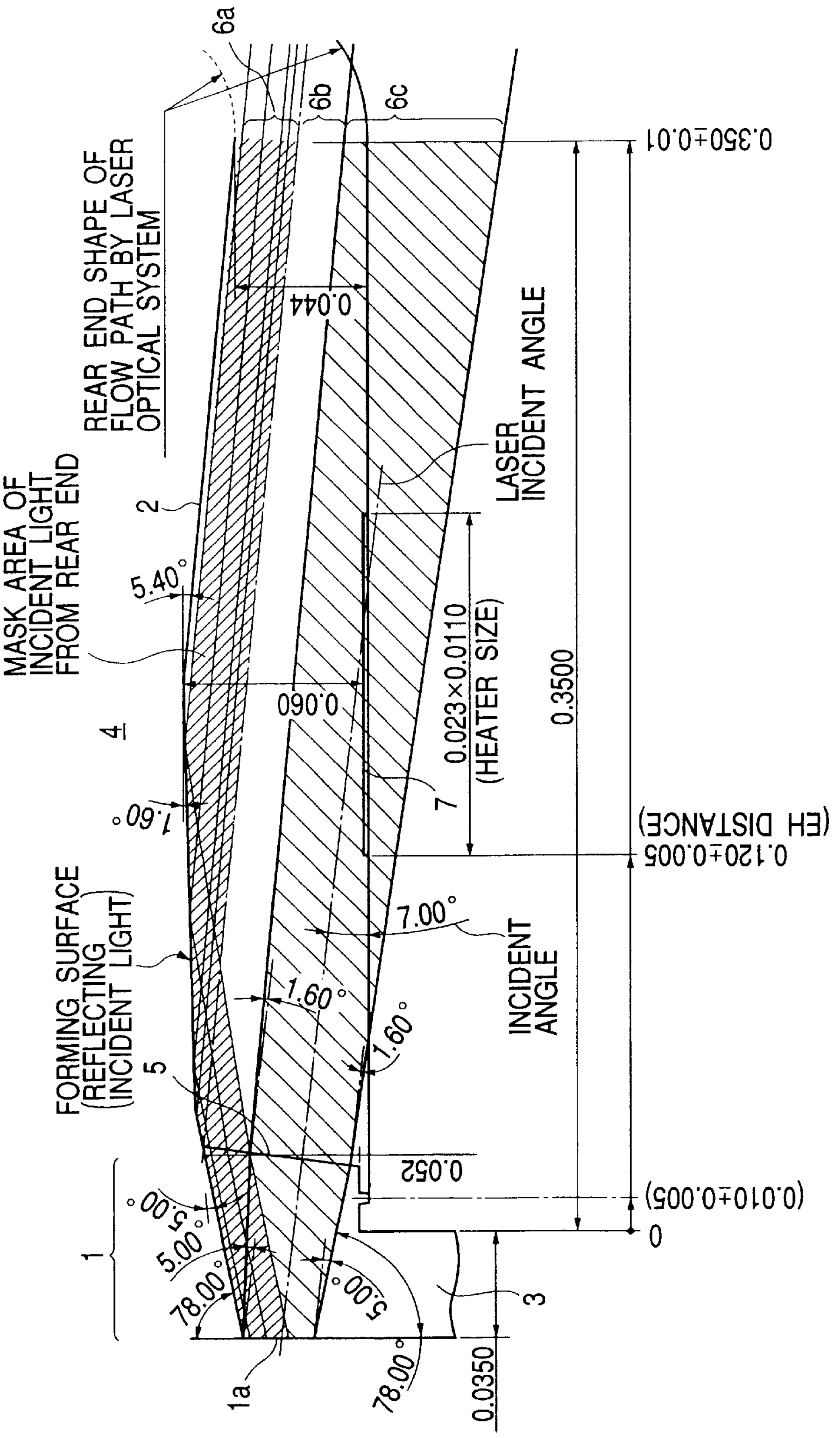
FIG. 1 is a view which schematically shows the example of laser processing in accordance with the present invention.

FIG. 1 is a view which schematically shows the example of laser processing in accordance with the present invention. In FIG. 1, a reference numeral 1 designates a hole (flow path) drilled by the laser processing; 2, the flow path through which ink is supplied; 3, an orifice plate where holes are formed; 4, a grooved ceiling plate serving as the second base plate; 5, the laser processing surface; 6*a*, the area A of the laser beam; 6*b*, the area B; 6*c*, the area C; and 7, an electrothermal transducing element to generate thermal energy utilized for discharging ink, that is, a heater (heat generating element) serving as the energy generating element.

With the structure described above, the light transmitting area for use of reflection (area A at 6*a*), the light shielding area (area B at 6*b*), and the light transmitting area for use of direct light (area C at 6*c*) are in contact in that order.

At first, when light is incident upon the area A at 6*a* from the rear end of the flow path at a certain angle in the liquid flowing direction, the light reflected at the bottom surface of the groove of the second base plate form the upper part of the hole (nozzle) 1 as shown in FIG. 1. At this juncture, since the area B is present at 6*b*, the upper part of the hole 1 is formed only by the reflected light. The lower part of the nozzle is formed by light incident upon the area C at 6*c*.

The position of the drilled hole 1 in the vertical direction and the hole area are controlled and minutely adjusted by changing the angle at which the work piece (grooved ceiling plate 4) is installed for laser processing, as well as changing the distance between the light source and the work piece. Fundamentally, the laser processing apparatus is made functional in controlling the X, Y, Z, and zero directions of work piece freely. Therefore, with the consideration given at the designing state in advance as to dealing with the data on the grooving shape (particularly on the bottom surface of the groove), the incident angle, the shape of hole 1 to be processed, and the drilling angle, it becomes possible to set the appropriate position and inclination of the work piece on the processing block by means of the software sequence. In other word, the drilling angle can be controlled by the angle of reflecting light of the laser beam on the bottom surface of the groove, and the incident angle of the laser beam entering the groove, among the groove wall faces of the second base plate.

Figure 10:
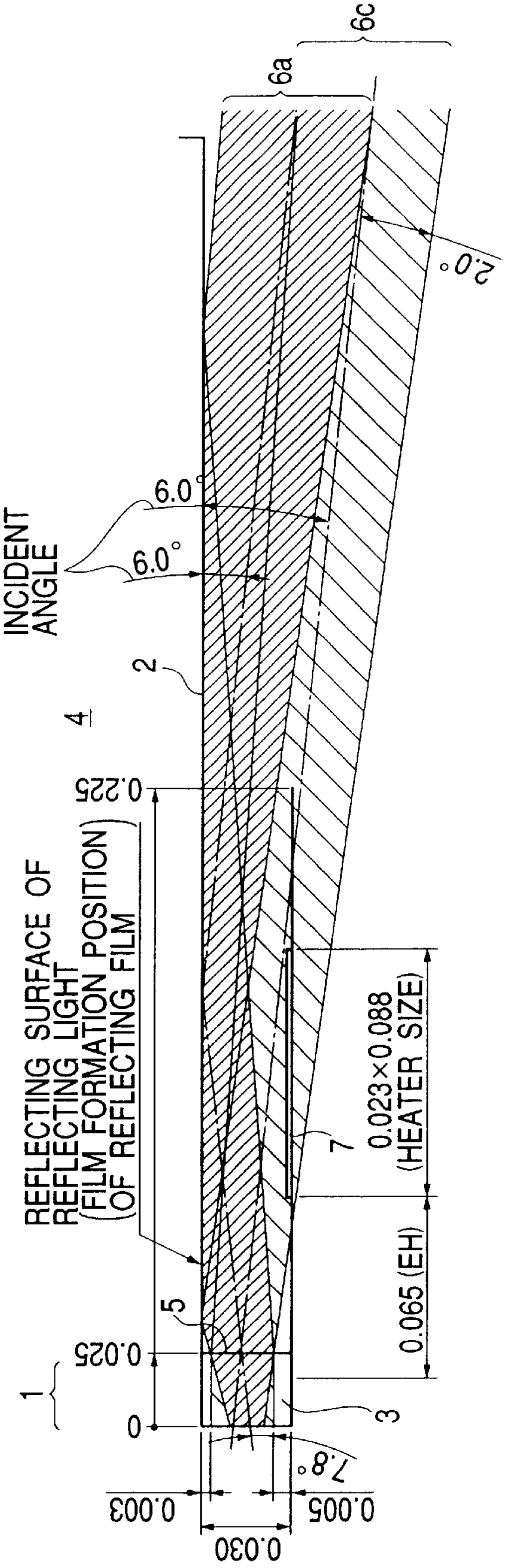
FIG. 10 is a view which schematically shows each of the processing positions of the reflecting light and direct light for the laser processing by use of the reflecting light shown in FIG. 1.

Particularly, with use of the drilling mask pattern for the irradiation of laser beams, it is preferable to adopt the method for forming the light shielding area (the area B at 6*b*) all over the light emitting area in the direction of the flow path array closely to the area (area A at 6*a*) of the incident light which becomes the reflecting light ultimately among the light transmitting areas of the mask pattern as shown in FIG. 1. Also, if it is desired to make a larger hole in the narrower processing region, such implementation is possible as shown in FIG. 10 by inverting the processing position of the reflecting light and that of the direct light on the processing drawing shown in FIG. 1.

With the laser processing structured as described above, it becomes possible to process the central axis of the hole 1 in the flow direction in parallel to the upper surface (that is, the flow path forming surface) of the first base plate. Then, such central axis is made open orthogonal to the surface of the orifice plate 3 (the plane on the front side where the orifice plate is formed). In this way, the technical problems discussed earlier are solved.

Also, as described earlier, it is preferable for the present invention to process the shape of the first base palate and the discharge ports on the farther side by use of the direct light among the shapes of the discharge port portion, and to process the discharge portion on the nearer side on the first base plate by use of the reflecting light among the shapes of the discharge port portion. It may be possible to arrange the irradiation area one and the same on the processing surfaces of the direct light and reflecting light. For the generating of effective reflecting light, it may also be preferable to provide the reflecting film on the side faces of each groove on the second base plate where the reflecting light is reflected.

The drilling angle should only be controlled for the angle of the reflecting light of the laser beam on the bottom surface of each groove among the wall faces of each groove on the second base plate, and also, controlled for the angle of the direct light of the laser beam incident upon the groove. However, it may be possible to control the drilling angle by means of the output ratio between the reflecting light and the direct light. Also, it is preferable to equalize the laser beam after being reflected from the wall faces of each groove on the second base plate, and the output of the direct light.

For the light source, it may be possible to use the excimer laser beams, femtosecond laser beams, or the like.

For the base plate material for the second base plate, it is preferable to use silicon or the like. It is also effective to process the grooves of the second base plate by means of the micromachining.

Figure 2A:
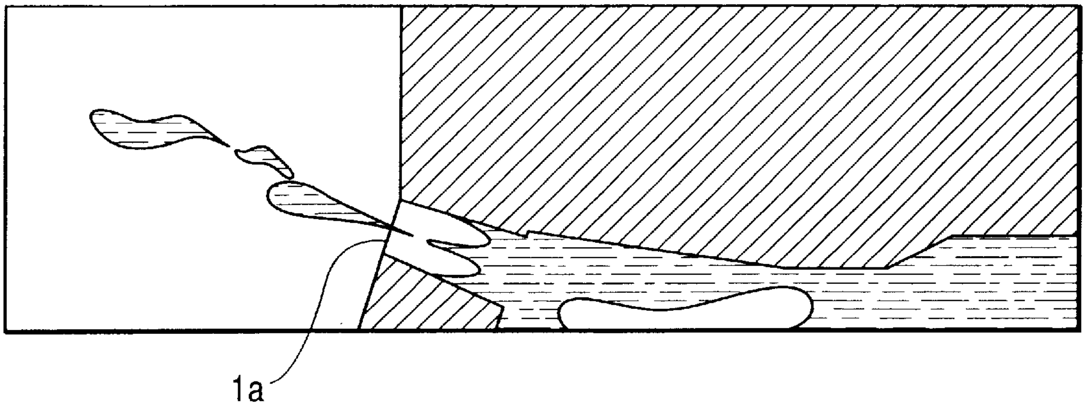
FIGS. 2A, 2B, and 2C are side sectional views which schematically illustrate the relationship between the discharging condition of ink droplet from the discharge port of an ink jet recording head, and the dot satellites.
Figure 2B:
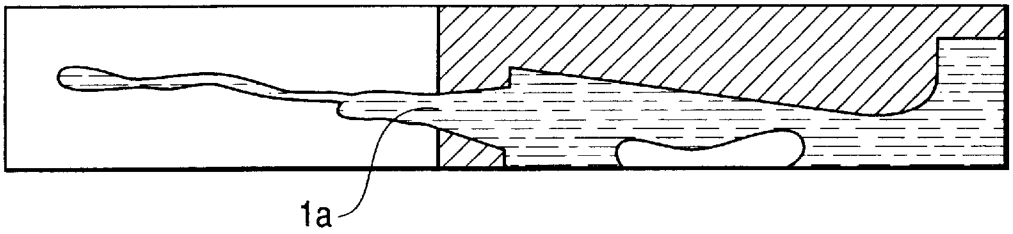
Figure 2C:
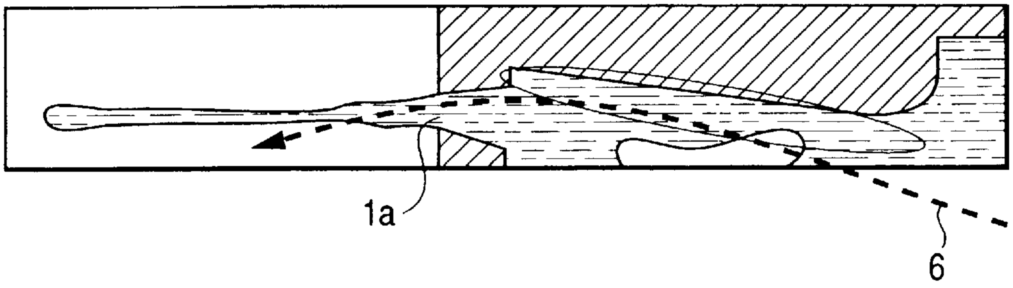

FIGS. 2A to 2C are side sectional views which schematically illustrate the relationship between the discharging condition of ink droplet from the discharge port 1*a* of an ink jet recording head, and the dot satellites. FIG. 2A relates to the conventional art. In a state where the direction of ink flow changes immediately before the droplet is discharged as shown here, the velocity vector of ink is dispersed to make it impossible to keep droplets to be in the original direction in which the droplets should be discharged, which may cause the unstable condition of discharges where the satellites are discharged in the direction different from the one in which the main droplets are discharged. FIG. 2B shows the mode in which the discharges are approximated to the vertical discharges. Even for this mode, difference still remains between the angle of the main droplet and that of satellites.

FIG. 2C shows the mode in accordance with the present invention. Here, the mode is such that the vertical discharge is corrected more ideally than the one shown in FIG. 2B (the direction of ink flow in front of the heater, and the discharge direction of the ink droplet are both perpendicular to the discharge port surface). The drilling is effectuated at a descending taper angle by the utilization of reflecting light of the laser beam 6.

Here, for the present invention, the term "orthogonal", the term "parallel", and the term "perpendicular" are used to mean that these are substantially orthogonal, parallel or perpendicular to the extent that each of them may demonstrate the effect of the present invention. More specifically, there is almost no problem for the actual printing if only any one of the angles for them is within a range of 1.8°, respectively. However, with the designing theory in view, it is desirable that there is no deviation at all.

It is also possible to form the grooves by means of molding, laser processing, or the like in order to provide the flow paths 2 for the grooved ceiling plate 4.

For the present invention, an ink jet recording head is produced by bonding the orifice plate and the ceiling plate (the second base plate) integrally formed with grooves, for example. Then, by the application of electric energy to the heat generating elements, liquid on each of the heat generating elements is bubbled, and by the bubbling energy thereof, liquid can be discharged from the aforesaid nozzles.

Figure 13:
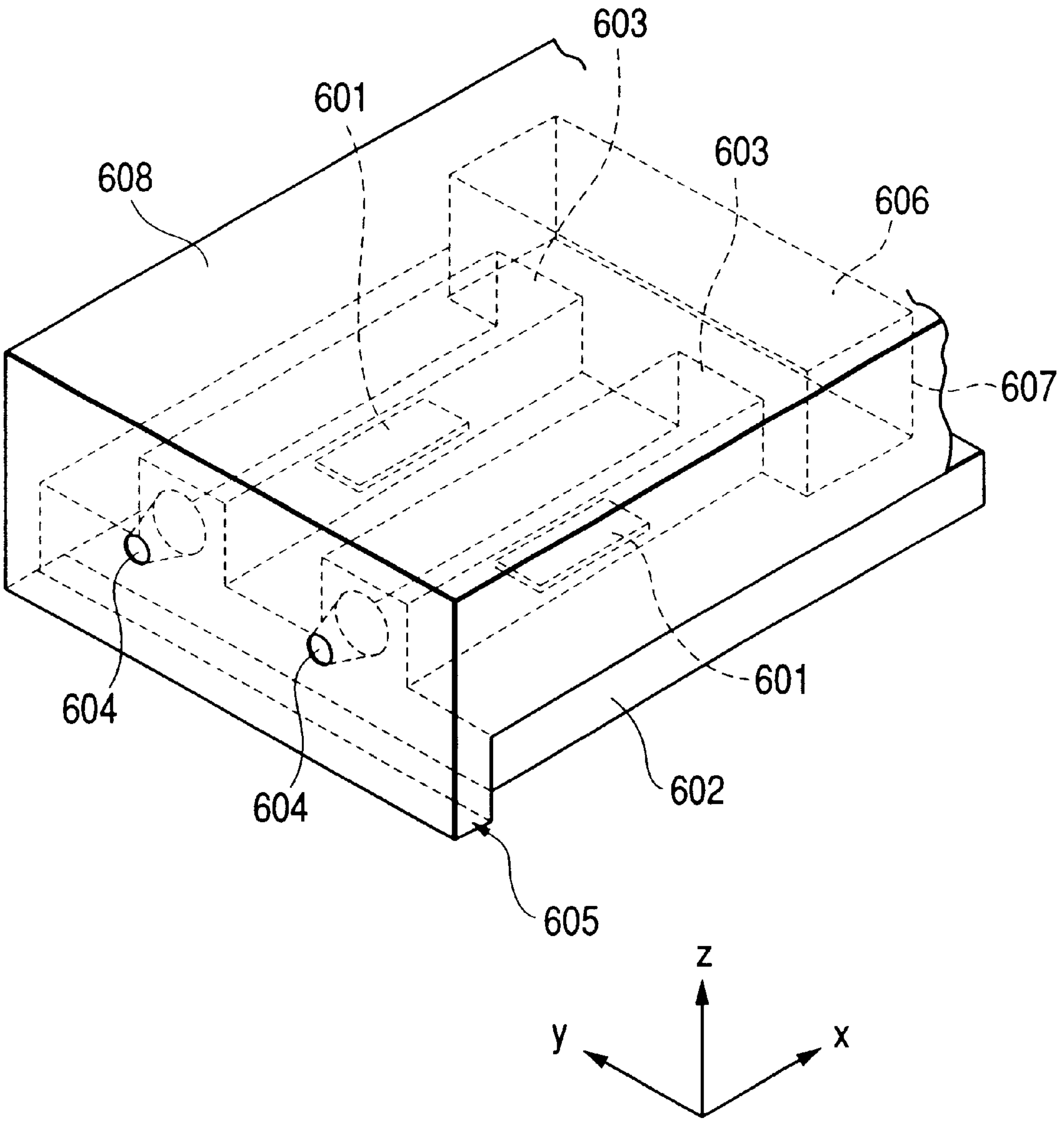
FIG. 13 is a perspective view which schematically shows an ink jet recording head.

FIG. 13 is a perspective view which schematically shows an ink jet recording head. As shown in FIG. 13, the ink jet recording head is formed by bonding the base plate 602 and the ceiling plate 608. For the base plate 602, energy generating elements are arranged to generate energy utilized for discharging ink. In FIG. 13, electrothermal transducing elements 601 are arranged as energy generating elements to generate thermal energy. The grooves 603 for forming the ink flow paths are provided for the ceiling plate 608 to face the electrothermal transducing elements 601, respectively. At the edge portion of grooves 603, the discharge port forming member 605 is integrally arranged with the ceiling plate 608 in such a manner that ink discharge ports 604 are communicated with the grooves 603, respectively. For the ink flow paths, ink is supplied from the common ink chamber 606 which is formed by a frame 607.

Of the ink jet recording methods, the present invention produces excellent effect particularly with a recording head of ink jet recording method that forms flying droplets by the utilization of thermal energy.

As regards the typical structure and operational principle of such method, it is preferable to adopt those implemental by the application of the fundamental principle disclosed in the specifications of U.S. Pat. Nos. 4,723,129 and 4,740,796, for example. This method is applicable to the so-called on-demand type recording and continuous type one as well. Here, the on-demand type is particularly effective, because it gives at least one driving signal to each of the electrothermal transducing elements arranged for a sheet or a liquid path where liquid (ink) is retained, and provides an abrupt temperature rise beyond nuclear boiling in accordance with recording information to generate thermal energy by each of the electrothermal transducing elements, hence creating film boiling on the thermal activation surface of recording head to effectively form resultant bubbles in liquid (ink) one to one corresponding to each of the driving signals. Then, by the development and contraction of each bubble, the liquid (ink) is discharged through each of the discharge openings, hence forming at least one droplet. The driving signal is more preferably in the form of pulses because the development and contraction of the bubble can be made instantaneously and appropriately to attain performing particularly excellent discharges of liquid (ink) in terms of the response action thereof.

The driving signal in the form of pulses is preferably such as disclosed in the specifications of U.S. Pat. Nos. 4,463,359 and 4,345,262. In this respect, the temperature increasing rate of the thermoactive surface is preferably such as disclosed in the specification of U.S. Pat. No. 4,313,124 for an excellent recording in a better condition.

As the structure of the recording head, there are included in the present invention, the structure such as disclosed in the specifications of U.S. Pat. Nos. 4,558,333 and 4,459,600 in which the thermal activation portions are arranged in a curved area, besides those which are shown in each of the above-mentioned specifications wherein the structure is arranged to combine the discharging openings, liquid paths, and the electrothermal transducing devices (linear type liquid paths or right-angled liquid paths).

In addition, the present invention is effectively applicable to the structure disclosed in Japanese Laid-Open Application No. 59-123670 wherein a common slit is used as the discharging openings for plural electrothermal transducing devices, and to the structure disclosed in Japanese Patent Laid-Open Application No. 59-138461 wherein an aperture for absorbing pressure waves of thermal energy is formed corresponding to the discharge openings.

Further, the present invention can demonstrate the aforesaid effect more efficiently when applied to a full-line type recording head the length of which corresponds to the maximum width of a recording medium recordable by such recording apparatus. Here, for the full-line type recording head, it may be possible to adopt either a structure whereby to satisfy the required length by combining a plurality of recording heads or a structure arranged by one integrally formed recording head.

In addition, it may be possible to use an exchangeable chip type recording head which makes electrical connection with or ink supply from the main body of an apparatus possible when it is installed on the main body of the apparatus or it may be possible to use a cartridge type head having an ink tank integrally formed with the recording head itself.

Also, for the present invention, it is preferable to additionally provide a recording head with recovery means and preliminarily auxiliary means as constituents of the recording apparatus because these additional means contribute to making the effectiveness of the present invention more stabilized. To name them specifically, these are capping means, cleaning means, suction or compression means, pre-heating means such as electrothermal transducing devices or heating devices other than such transducing devices or the combination of those types of devices. Here, also, the performance of a pre-discharge mode whereby to make discharge other than the regular discharge is effective for the execution of stable recording.

Also, the present invention is extremely effective in applying it not only to a recording mode in which only main color such as black is used, but also to an apparatus having at least one of multi-color modes with ink of different colors, or a full-color mode using the mixture of the colors, irrespective of whether the recording heads are integrally structured or it is structured by a combination of plural recording heads.

In the embodiments of the present invention described above, while the ink has been described as liquid, it may be an ink material which is solidified below the room temperature but liquefied at the room temperature. Here, also, since the ink is generally controlled for the ink jet method within the temperature not lower than 30° C. and not higher than 70° C. to stabilize its viscosity to effectuate the stable discharges, the ink may be such as to be liquefied when the applicable recording signals are given.

In addition, it may be possible to use ink which is liquefied only by the application of thermal energy, but solidified when left intact in order to positively prevent the temperature from rising due to the thermal energy by use of such energy as the energy which should be consumed for changing states of ink from solid to liquid, or to prevent ink from being evaporated. In either case, for the present invention, it may be possible to adopt the use of ink having a nature of being liquefied only by the application of thermal energy, such as ink capable of being discharged as ink liquid by enabling itself to be liquefied anyway when the thermal energy is given in accordance with recording signals, and ink which will have already begun solidifying itself by the time it reaches a recording medium. In such a case, it may be possible to retain ink in the form of liquid or solid in the recesses or through holes of a porous sheet such as disclosed in Japanese Patent Laid-Open application No. 54-56847 or 60-71260 in order to enable the ink to face the electrothermal transducing devices. In the present invention, the most effective method for the various kinds of ink mentioned above is the one which is capable of implementing the film boiling method as described above.

Now, hereunder, the embodiments will be described in accordance with the present invention.

First Embodiment

An ink jet head is manufactured by means of excimer laser processing by the utilization of reflecting light as shown in FIG. 1. Here, using polysulfone as the material for the ceiling plate the grooves that become flow paths are formed by molding method. The deepest portion of each flow path is 0.060 mm, the depth of laser processing surface is 0.052 mm, the depth of rearmost portion of flow path is 0.040 mm, the length thereof is 0.350 mm, the size of heater (heat generating element) is 0.023×0.110 $mm^2$ each, the thickness of the orifice plate is 0.035 mm, and the distance between the edge and heater is 0.120 mm.

The expanse of the incident light of the laser beam running in space is 1.60° on one side in the vertical direction, and 1.20° on one side in the horizontal direction. The processing gradient is 5° on one side. The processing is performed on the work piece with the laser beam having power of 1 mJ/cm per pulse, and laser is concentrated by use of a three-divided lens.

Figure 3:
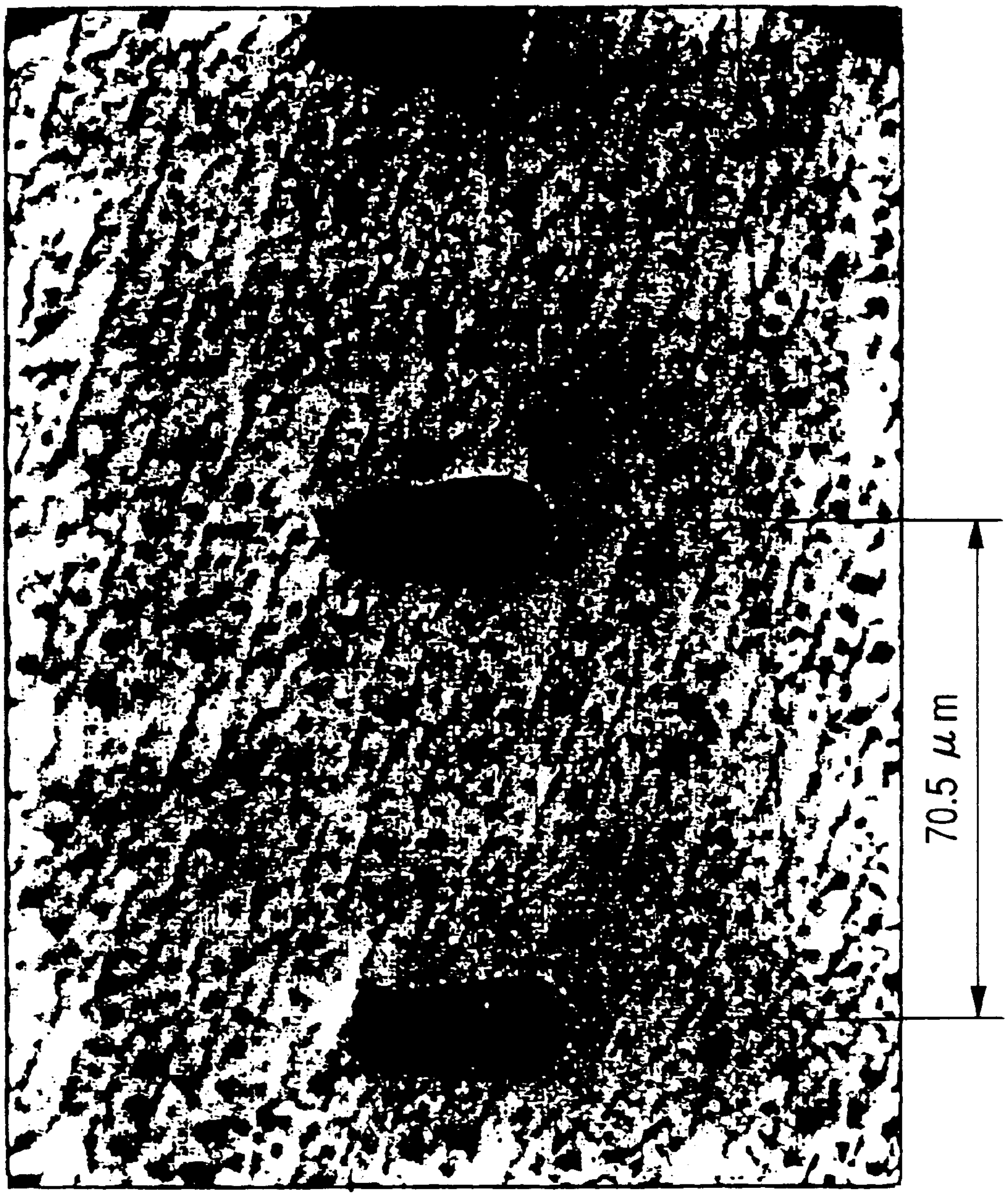
FIG. 3 is a microscopic photograph of the hole shapes of nozzles obtainable in accordance with a first embodiment of the present invention.

Under such condition, the laser beam is incident upon the first base plate at the incident angle of 7°. Then, at the processing gradient of 78° on one side to the orifice plate plane, the hole (nozzle) is formed with its central axis being orthogonal to the orifice plate plane and in parallel with the first base plate. The hole area thus formed is 400 $\mu m^2$ ±30 $\mu m^2$. FIG. 3 is a microscopic photograph of the hole shape obtainable in accordance with the present embodiment.

Figure 4:
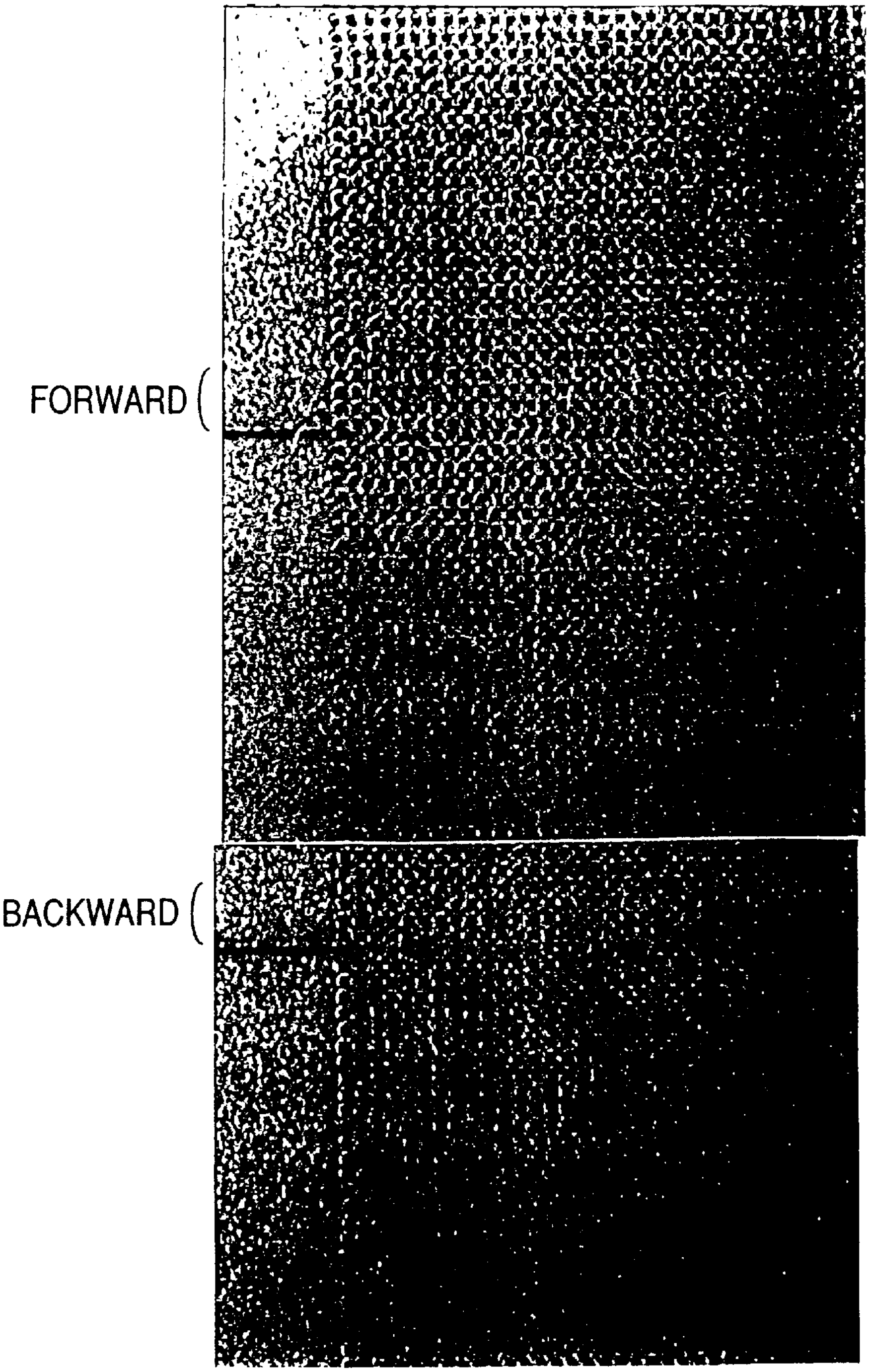
FIG. 4 is a microscopic photograph of dots formed by the reciprocal printing in accordance with the first embodiment of the present invention.
Figure 5:
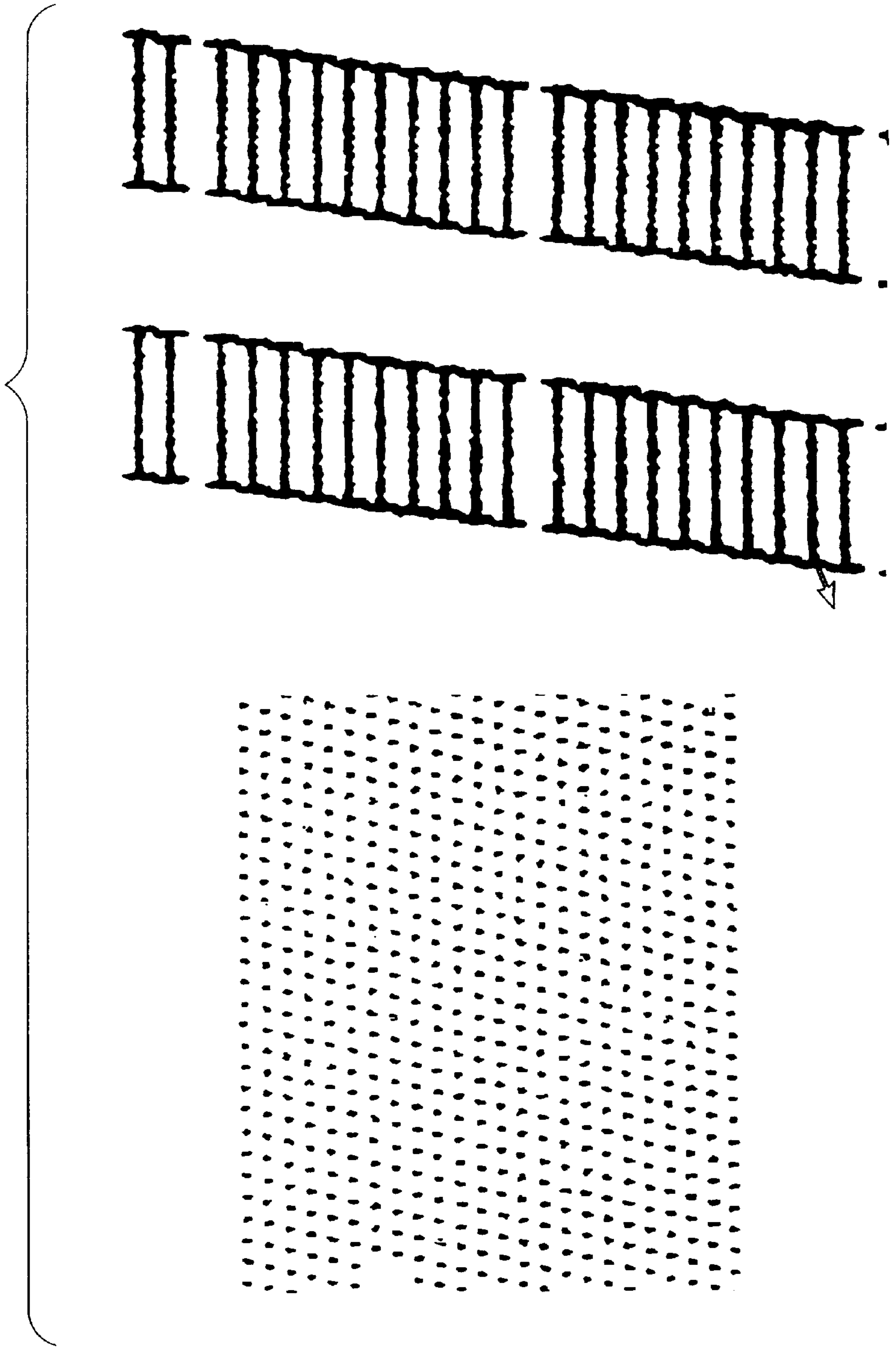
FIG. 5 is an enlarged views which illustrate the image formed in accordance with the first embodiment.
Figure 6:
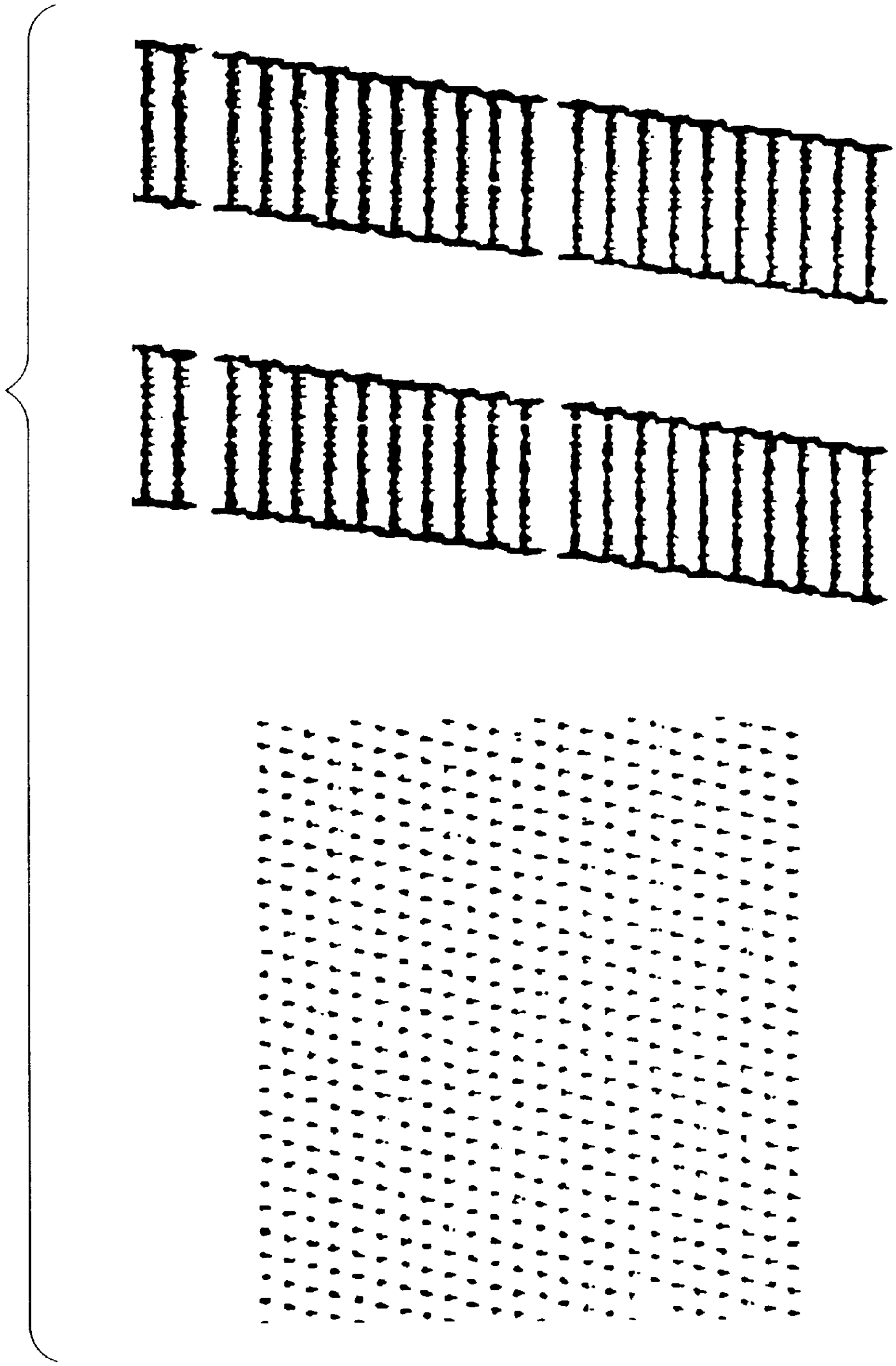
FIG. 6 is an enlarged views which illustrate the image formed by use of the conventional head in order to compare with the representation of FIG. 5.

The nozzles thus formed are provided for an ink jet recording head of 360 dpi×64 nozzle type to form images by use of a serial printer. Then, it is confirmed that dots are not affected by satellites on both forward and backward operations. FIG. 4 is a microscopic photograph of dots formed by the reciprocal printing in accordance with the present embodiment. FIG. 5 is an enlarged views which illustrate the image formed in accordance with the present embodiment. FIG. 6 is an enlarged views which illustrate the image formed by use of the conventional head in order to compare with the representation of FIG. 5. When comparing FIG. 6 with FIG. 5, it is readily understandable that the gaps between the main droplet and its satellites are improved by the implementation of the present embodiment.

Figure 7:
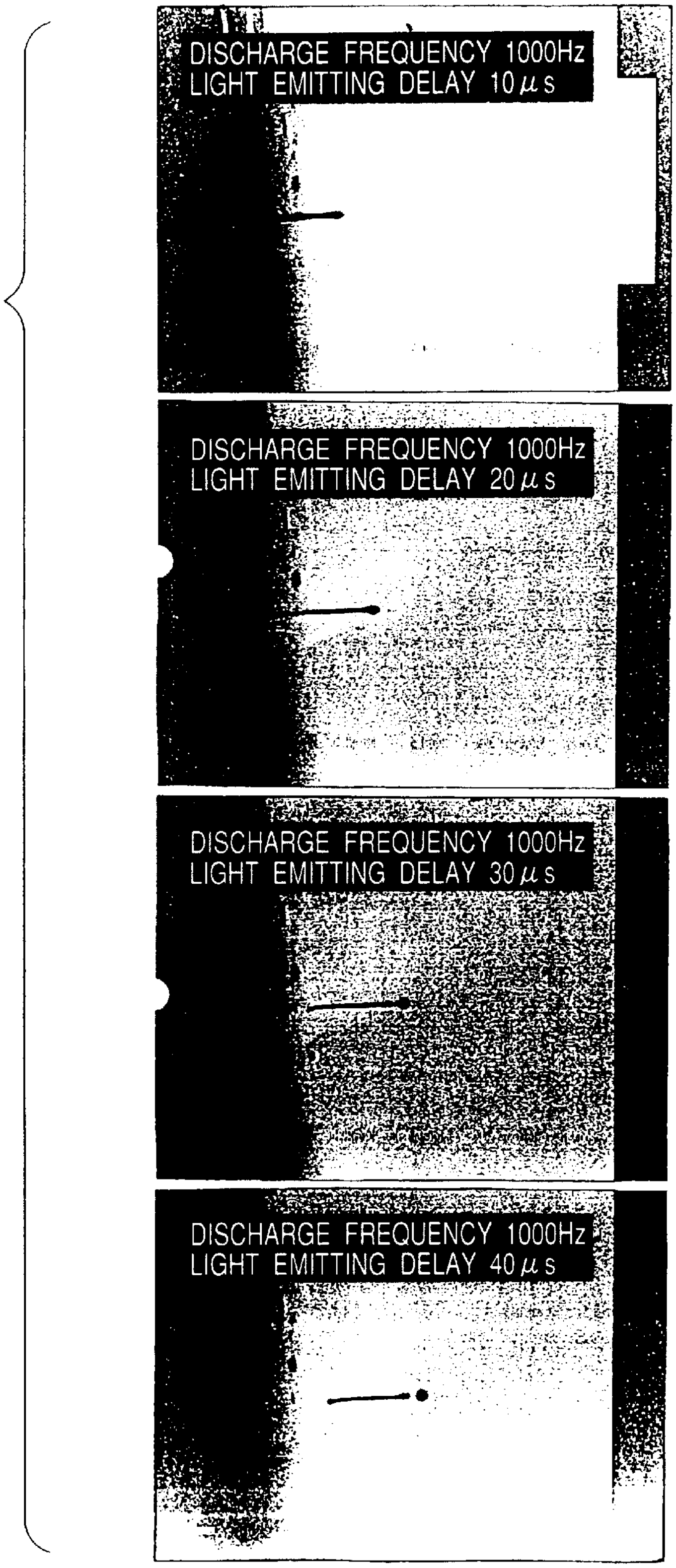
FIG. 7 is a photograph to confirm the ink discharges by use of a discharge observation device (CADVAMS) for the head of the first embodiment.
Figure 8:
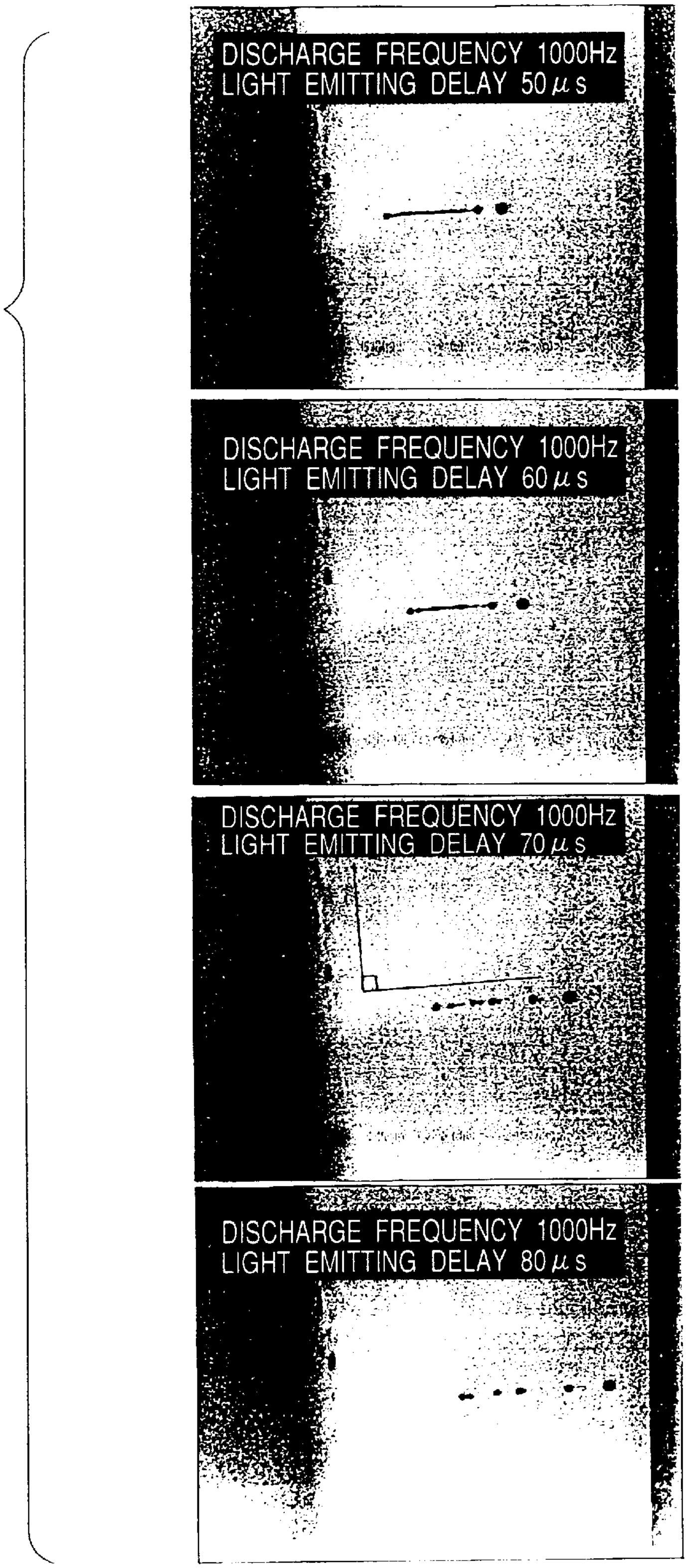
FIG. 8 is a photograph to confirm the ink discharges by use of the discharge observation device for the conventional head in order to compare with the photograph shown in FIG. 7.

Further, FIG. 7 is a photograph to confirm the ink discharges by use of a discharge observation device (CADVAMS) for the head of the first embodiment, and FIG. 8 is a photograph to confirm the ink discharges by use of the discharge observation device for the conventional head in order to compare with the photograph shown in FIG. 7. In comparison with FIG. 8, it is clear that the present embodiment makes the implementation of the vertical discharges possible. In other words, it is confirmed that the present embodiment makes the vertical discharges possible as the simulation shown in FIG. 2C.

Second Embodiment

Figure 9:
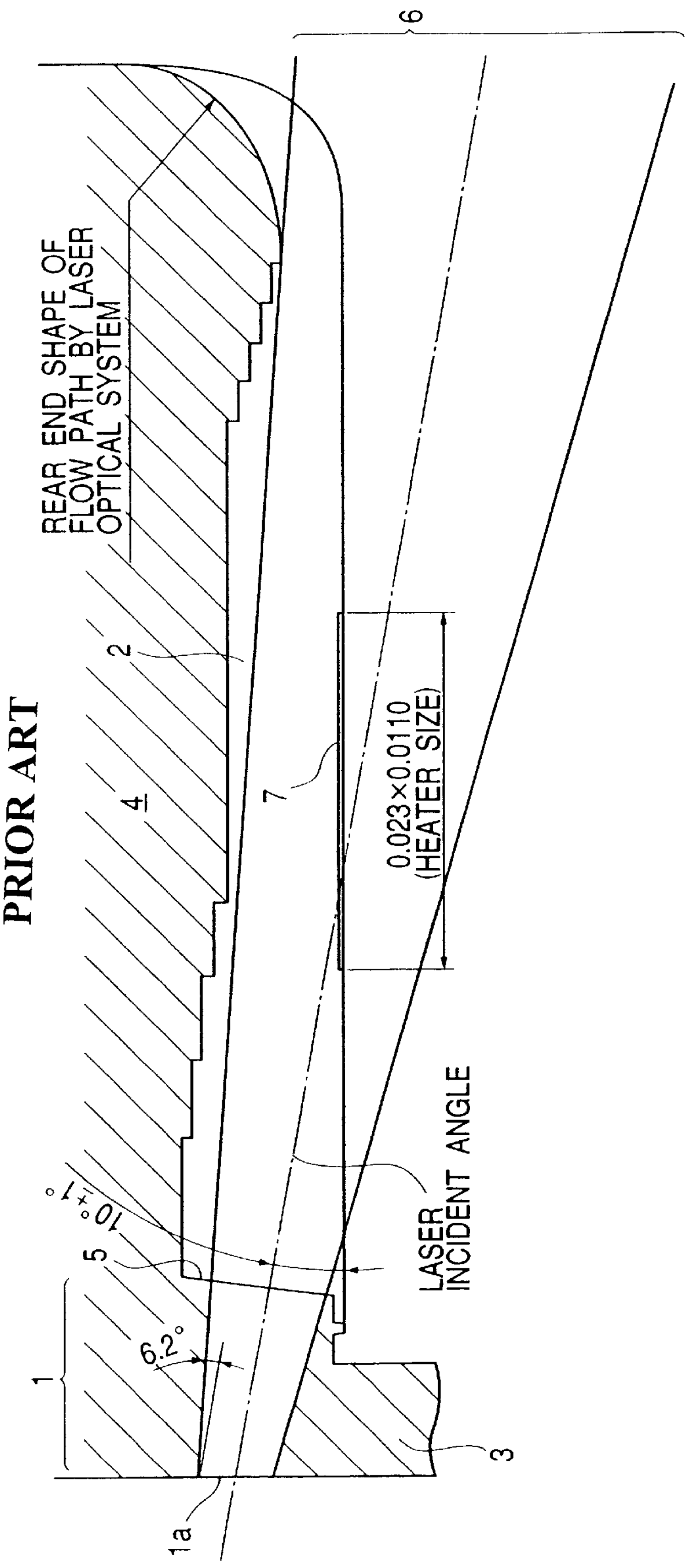
FIG. 9 PRIOR ART
FIG. 9 is a view which schematically shows the example of the conventional layer processing.
Figure 11:
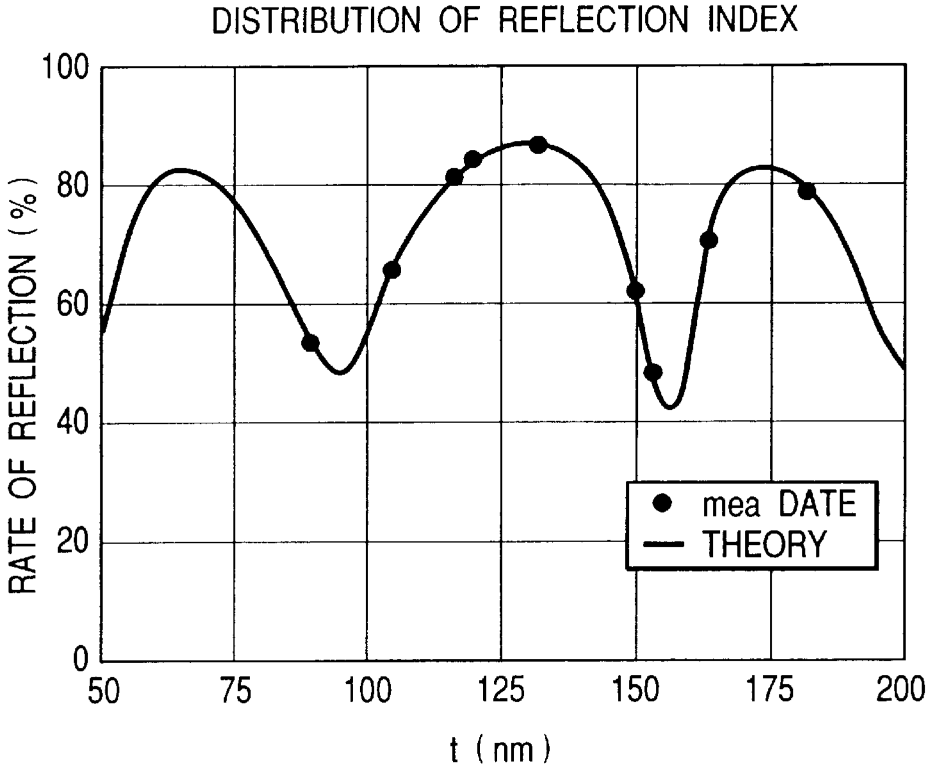
FIG. 11 is a graph which shows the experimental value and the logical value which represent the correlations between the thickness of $SiO_2$ film and the reflectance of the laser light.

An ink jet head is manufactured by means of the excimer later processing that utilizes reflecting light as shown in FIG. 1. Here, however, the processing position of the reflecting light and that of direct light are inverted (see FIG. 9). For the ceiling plate in this case, Si is used as its material. Each groove of the flow paths is integrally formed by means of micromachining. The depth of each flow path is 0.030 mm, the length thereof is 0.200 mm, the size of heater is 0.023×0.88 $mm^2$, the thickness of the orifice plate is 0.025 mm, and the distance between the edge and heater is 0.065 mm. Also, the wall faces of the groove where reflecting light is reflected are formed by $SiO_2$ reflecting film. The film thickness is 120 nm where the reflectance becomes almost maximum after obtaining the correlations between the film thickness and the reflectance from the experimental and logical values. FIG. 11 is a graph which shows the experimental value and the logical value which represent the correlations between the thickness of $SiO_2$ film and the reflectance of the laser light.

Figure 12:
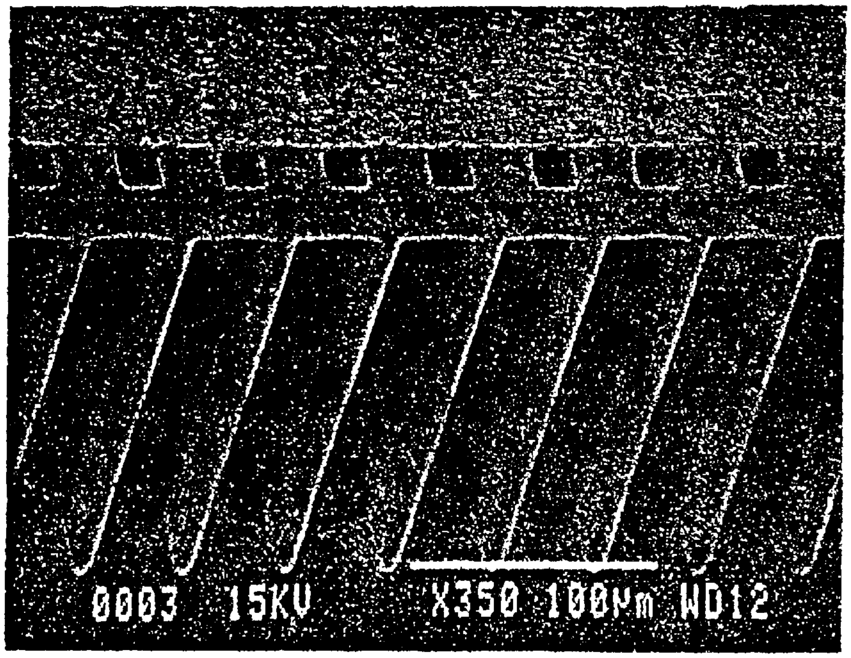
FIG. 12 is a microscopic photograph which shows each hole shape of nozzles obtainable in accordance with a second embodiment of the present invention.

The expanse of the incident light of the laser beam running in space is 2.0° in the vertical direction, and 1.5° in the horizontal direction. The incident angle is 6.0°. The output of the laser beam on the processing surface is 1 $J/cm^2$ per pulse. Under the condition described above, the hole area is formed to be approximately 320 $\mu m^2$. FIG. 12 is a microscopic photograph which shows each hole shape of nozzles obtainable in accordance with a second embodiment of the present invention.

The nozzles thus formed are provided for an ink jet recording head of 600 dpi×2400 nozzle type to form images by use of a serial printer. Then, it is confirmed that dots are not affected by satellites the same as the first embodiment.

What is claimed is:

1. A method for manufacturing an ink jet recording head provided with a first base plate having energy generating elements for generating energy utilized for discharging ink, and a second base plate bonded to said first base plate, said second base plate having grooves having wall faces for forming ink flow paths corresponding to said energy generating elements, and a discharge port forming member disposed at an end of said grooves for forming ink discharge ports, said method comprising:

a discharge port formation step of forming said discharge ports by simultaneously irradiating throughout the discharge port formation step both a reflected laser beam light reflected from the wall faces of the grooves of said second base plate, and a direct laser beam light on said discharge port forming member; and a flow path formation step of forming said flow paths by bonding said first base plate and said second base plate with said grooves inside.

2. A method for manufacturing an ink jet recording head according to claim 1, wherein said discharge ports on a side farther from the first base plate, among configured portions of discharged ports, are configured by direct light, and said discharge ports on a side nearer to the first base plate, among configured portions of discharge ports, are configured by reflecting light.

3. A method for manufacturing an ink jet recording head according to claim 1, wherein irradiating areas of the direct light and the reflected light are the same on a laser processing surface.

4. A method for manufacturing an ink jet recording head according to claim 1, wherein reflecting film is provided for the wall faces of the second base plate reflecting the reflected light.

5. A method for manufacturing an ink jet recording head according to claim 1, wherein a central axis of a hole drilled by the irradiated reflected and direct laser beam light in an ink flow direction is orthogonal to a front face of the discharge port forming member, and is parallel to the grooves for forming ink flow paths of the second base plate.

6. A method for manufacturing an ink jet recording head according to claim 1, wherein irradiating angles are controlled by adjusting angles of the reflected laser beam light, and angles of the direct laser beam light incident upon said grooves, wherein of the wall faces, the reflected laser beam light is reflected from a bottom wall face of the grooves of said second base plate.

7. A method for manufacturing an ink jet recording head according to claim 1, wherein irradiating angles are controlled by an output ratio between the reflected light and the direct light.

8. A method for manufacturing an ink jet recording head according to claim 1, wherein the reflected light is equalized with the direct light.

9. A method for manufacturing an ink jet recording head according to claim 1, wherein a drilling mask pattern is used for irradiating laser beams, and among light transmitting areas of said mask pattern, light shielding areas are formed to cover an entire region of said light transmitting areas in the direction of the flow path between areas becoming the reflecting light, and the areas becoming the direct light.

10. A method for manufacturing an ink jet recording head according to claim 1, wherein the laser beam light is excimer laser light.

11. A method for manufacturing an ink jet recording head according to claim 1, wherein the laser beam light is femtosecond laser light.

12. A method for manufacturing an ink jet recording head according to claim 1, wherein the second base plate is made of silicon.

13. A method for manufacturing an ink jet recording head according to claim 1, wherein the groove portion of the second base plate is formed by a micromachining process.

14. A method for manufacturing an ink jet recording head according to claim 1, wherein the groove portion of the second base plate is formed by molding.

15. A method for manufacturing an ink jet recording head according to claim 1, wherein the groove portion of the second base plate is formed by laser processing.

* * * * *

UNITED STATES PATENT AND TRADEMARK OFFICE

CERTIFICATE OF CORRECTION

PATENT NO. : 6,748,657 B1
DATED : June 15, 2004
INVENTOR(S) : Masato Muraki et al.

It is certified that error appears in the above-identified patent and that said Letters Patent is hereby corrected as shown below:

Column 1,
Line 20, "from" should read -- form --.

Column 3,
Line 14, "instable" should read -- unstable --;
Line 31, "views" should read -- view --; and
Line 34, "views" should read -- view --.

Column 4,
Line 37, "word," should read -- words, --.

Column 8,
Line 40, "views" should read -- view --;
Line 42, "views" should read -- view --; and
Line 63, "later" should read -- laser --.

Signed and Sealed this

Twenty-first Day of September, 2004

JON W. DUDAS
*Director of the United States Patent and Trademark Office*

UNITED STATES PATENT AND TRADEMARK OFFICE

CERTIFICATE OF CORRECTION

PATENT NO. : 6,748,657 B1
DATED : June 15, 2004
INVENTOR(S) : Takeshi Okazaki et al.

It is certified that error appears in the above-identified patent and that said Letters Patent is hereby corrected as shown below:

<u>Column 1</u>,
Line 20, “from” should read -- form --.

<u>Column 3</u>,
Line 14, “instable” should read -- unstable --;
Line 31, “views” should read -- view --; and
Line 34, “views” should read -- view --.

<u>Column 4</u>,
Line 37, “word,” should read -- words, --.

<u>Column 8</u>,
Line 40, “views” should read -- view --;
Line 42, “views” should read -- view --; and
Line 63, “later” should read -- laser --.

This certificate supersedes Certificate of Correction issued September 21, 2004.

Signed and Sealed this

Sixth Day of September, 2005

JON W. DUDAS
*Director of the United States Patent and Trademark Office*